United States Patent
Kaveri et al.

(10) Patent No.: US 11,301,304 B2
(45) Date of Patent: Apr. 12, 2022

(54) METHOD AND APPARATUS FOR MANAGING KERNEL SERVICES IN MULTI-CORE SYSTEM

(71) Applicant: SAMSUNG ELECTRONICS CO., LTD., Suwon-si (KR)

(72) Inventors: Anup Manohar Kaveri, Bangalore (IN); Vinayak Hanagandi, Bangalore (IN); Nischal Jain, Bangalore (IN); Rohit Kumar Saraf, Bangalore (IN); Shwetang Singh, Bangalore (IN); Samarth Varshney, Bangalore (IN); Srinivasa Rao Kola, Bangalore (IN); Younjo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 16/386,969

(22) Filed: Apr. 17, 2019

(65) Prior Publication Data
US 2019/0317827 A1    Oct. 17, 2019

(30) Foreign Application Priority Data

Apr. 17, 2018  (IN) .............................. 201841014608
Feb. 13, 2019  (IN) ........................... 2018 41014608

(51) Int. Cl.
*G06F 9/50* (2006.01)
*G06F 21/62* (2013.01)
(Continued)

(52) U.S. Cl.
CPC .......... *G06F 9/5077* (2013.01); *G06F 9/3885* (2013.01); *G06F 9/4881* (2013.01); *G06F 21/6281* (2013.01)

(58) Field of Classification Search
CPC .. G06F 21/6281; G06F 9/3885; G06F 9/4881; G06F 9/5077; G06F 9/526
See application file for complete search history.

(56) References Cited

U.S. PATENT DOCUMENTS 5,274,809 A * 12/1993 Iwasaki ................... G06F 9/526
                                                      710/200
6,529,983 B1 * 3/2003 Marshall ................... G06F 9/52
                                                      710/200

(Continued)

FOREIGN PATENT DOCUMENTS

KR    10-0269483 B1    10/2000

OTHER PUBLICATIONS

International Search Report (PCT/ISA/210) dated Jul. 29, 2019 issued by the International Searching Authority in International Application No. PCT/KR2019/004652.

(Continued)

*Primary Examiner* — Jorge A Chu Joy-Davila
(74) *Attorney, Agent, or Firm* — Sughrue Mion, PLLC

(57) ABSTRACT

The present disclosure provides method and apparatus for managing kernel services in multi-core system. Embodiments herein provide a method for managing kernel services in a multi-core system. The method includes configuring a lock for a kernel and object-specific locks for shared resources of the kernel and parallel processing IPC services for different shared resources on a plurality of cores of the multi-core system using the object-specific locks.

13 Claims, 11 Drawing Sheets

(51) Int. Cl.
   *G06F 9/38*   (2018.01)
   *G06F 9/48*   (2006.01)

(56)             References Cited

U.S. PATENT DOCUMENTS

| | | |
|---|---|---|
| 7,233,946 B1 | 6/2007 | McPolin |
| 7,984,446 B1 | 7/2011 | Lilliebjerg |
| 9,152,603 B1* | 10/2015 | Kelly, III .............. G06F 3/0689 |
| 2002/0078123 A1 | 6/2002 | Latour |
| 2007/0014295 A1 | 1/2007 | Fernandes et al. |
| 2008/0005741 A1 | 1/2008 | Terrell |
| 2008/0148291 A1 | 6/2008 | Huang et al. |
| 2009/0024825 A1* | 1/2009 | Thoelke ................ G06F 12/126 |
| | | 711/206 |
| 2013/0132627 A1 | 5/2013 | Dong et al. |
| 2013/0191817 A1* | 7/2013 | Vorbach ............. G06F 15/7807 |
| | | 717/150 |
| 2015/0193268 A1 | 7/2015 | Layton et al. |

OTHER PUBLICATIONS

Written Opinion (PCT/ISA/237) dated Jul. 29, 2019 issued by the International Searching Authority in International Application No. PCT/KR2019/004652.
Communication dated Mar. 15, 2021 issued by the European Intellectual Property Office in counterpart European Application No. 19789367.0.

\* cited by examiner

METHOD AND APPARATUS FOR MANAGING KERNEL SERVICES IN MULTI-CORE SYSTEM

CROSS-REFERENCE TO RELATED APPLICATION AND CLAIM OF PRIORITY

This application is based on and claims priority 35 U.S.C. § 119 to Indian Provisional Application Serial No. 201841014608 (PS) filed in the Indian Patent Office on Apr. 17, 2018 and Indian Patent Application Serial No. 201841014608 (CS) filed on Feb. 13, 2019, the disclosures of which are incorporated herein by reference in their entireties.

BACKGROUND

Field

The embodiments herein relate to real-time operating system. More particularly relates to a method and apparatus for managing kernel services in a multi-core system.

Description of Related Art

In general, Symmetric multi-processing (SMP) system is an important form of processing on a multi-core system. The SMP system processes a plurality of tasks using the multi-core system that are connected to a single, shared memory, having access to all input and output devices and are controlled by a single operating system instance that treats plurality of cores of the multi-core system equally. Each of the cores of the multi-core system run independent of each other and executes different programs by working on different sets of data. The operating system includes a kernel which implements core kernel services such as inter process communications (IPC) and critical section/resource management.

A task running on one core of the plurality of cores can send any message to another task which is running on the same core or a different core. Message queues (mailbox), events, signals are the IPCs used to communicate between tasks synchronously and asynchronously. The message queues and the events are examples of synchronous IPC while signal handling is an example of an asynchronous function calls. Global variables and buffers that can be accessed and modified from different threads or interrupt service routines (ISRs) are shared kernel resource among a plurality of tasks. When a first task accesses the shared kernel resource, a second task (s) should not be allowed to modify the shared kernel resource which is being accesses by the first task. The first task will read an inconsistent view of the shared kernel resource if the second task (s) accesses the shared kernel resource which is being read by the first task.

Therefore, in order to protect the shared kernel resources and kernel service object instances a common kernel lock is used. The kernel service object instances can be for example mutex, semaphore, events, message queues etc, associated with the core kernel services, across the plurality of cores of the multi-core system. However, the usage of the common kernel lock affects interrupt latency and thus affecting real time response of the multi-core system. Further, even if the tasks operating on the IPCs don't need any kernel scheduling, conventional methods take the common kernel lock thereby increasing the latency.

The above information is presented as background information only to help the reader to understand the present disclosure. Applicants have made no determination and make no assertion as to whether any of the above might be applicable as prior art with regard to the present application.

The principal object of the embodiments herein is to provide a method and apparatus for managing kernel services in a multi-core system.

Another object of the embodiments herein is to configure a lock for a kernel.

Another object of the embodiments herein is to configure object-specific locks for shared resources of the kernel.

Another object of the embodiments herein is to parallel process IPC services for different shared resources on a plurality of cores of the multi-core system using the object-specific locks.

SUMMARY

Accordingly the embodiments herein provide a method and for managing kernel services in a multi-core system. The method includes configuring a lock for a kernel and object-specific locks for shared resources of the kernel and parallel processing IPC services for different shared resources on a plurality of cores of the multi-core system using the object-specific locks.

Accordingly the embodiments herein provide an apparatus for managing kernel services in a multi-core system managing kernel services. The apparatus includes a memory, a multi-core processor comprising a plurality of cores, an operating system (OS) to execute on the multi-core processor, where the OS comprises a kernel; and a kernel resource engine, coupled to the multi-core processor and the memory. The kernel resource engine is configured to configure a lock for a the kernel and object-specific locks for shared resources of the kernel and parallel process IPC services for different shared resources on plurality of cores of the multi-core system using the object-specific locks.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1:
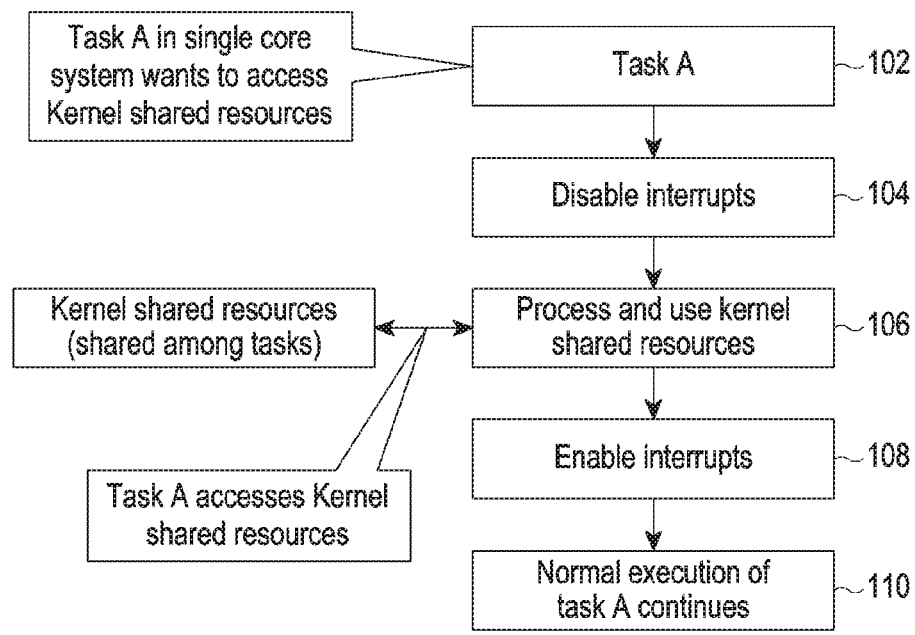
FIG. 1 illustrates steps to be performed by a task while accessing kernel shared resources in a single core system, according to prior art.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method and for managing kernel services in a multi-core system. The method includes configuring a lock for a kernel and object-specific locks for shared resources of the kernel and parallel processing IPC services for different shared resources on a plurality of cores of the multi-core system using the object-specific locks.

In an embodiment, parallel processing the IPC services for the different shared resources on the plurality of cores of the multi-core system using the object-specific locks includes receiving a task request to get access to at least one of the object of shared resource of the kernel. The method also includes acquiring an object-specific lock on the at least one object of shared resource of the kernel and determining based on given IPC operation on the kernel object whether any scheduling operation needs to be performed by the kernel. The task associated with the task request is either suspended, preempted or continued. A data structure of the shared resource is retrieved and further based on the data structure, the task is suspended, preempted or continued. If suspended, the object specific lock is released and a scheduler is invoked to schedule an existing task in a ready state to a running state.

In an embodiment, for determination of preempting, an existing task is determined to be suspended, a task control block (TCB) of the existing task is retrieved from the shared resource and is changed to a ready state. Further the retrieved TCB is determined to cause the preemption of the task. The object specific lock is then released and a scheduler is invoked to take scheduling action and place the existing task in a ready state to preempt the task associated with the task request.

In an embodiment, the task is continued by determining if at least one task or no task is in suspended state. Accordingly, if a suspended task is present, a TCB of the task is retrieved and according determined if the TCB does not cause preemption of the task associated with the task request. Upon releasing the object specific lock, the scheduler is invoked to add the existing task to a ready queue. Alternately, if no task is suspended, the object specific lock is released and the method terminates.

In an embodiment, the shared resources includes a mutex, a semaphore, an event, a message queue, and wherein the object-specific locks includes a mutex-specific lock, a semaphore-specific lock, an event-specific lock, and a message queue-specific lock.

In the conventional multi-core systems which supports the SMP, the kernel services acquires the common kernel lock to gain exclusive access to the shared resources of the kernel which restrict the parallel execution of the kernel object instances that are independent of each other when executing on different cores.

Unlike the conventional multi-core systems, the proposed method allows the kernel services to obtain exclusive access to the shared resources of the kernel without the common kernel lock by providing the kernel object instance specific locks. The use of the kernel object instance specific locks provides significant gain in the processing the kernel objects on different cores which are independent of each other.

The conventional multi-core systems, balance the scheduling of tasks on all the cores multi-core systems using the common kernel lock which affects the interrupt latency, thus affecting the real time response.

In the conventional multi-core systems, even if the tasks operating on the IPCs, do not require any kernel scheduling the tasks take the common kernel lock which increases the latency and keeps the other tasks waiting.

The conventional methods and systems do not classify the IPC's with respect to the IPC instances. Therefore, all kernel services working on the IPC objects treat the IPC as a common kernel resource. For example, consider M1 and M2 as different IPC mutex objects, then say Mutex_Post( ) considers both the M1 and the M2 as a single critical resource which cannot be accessed concurrently. Unlike to the conventional methods and systems, the proposed method considers both the M1 and the M2 as different resources which can be accessed simultaneously on different cores as the proposed method decouples the interdependency of the IPC objects.

In the conventional multi-core systems the kernel IPC API's do not distinguish between the IPC and the kernel shared data; considers both the IPC and the kernel shared data as single shared kernel resource which is guarded by a common kernel lock. Unlike to the conventional methods and systems, the proposed method provides separate locks for the IPC and the kernel shared data.

Referring now to the drawings, and more particularly to FIGS. 1 through 10, where similar reference characters denote corresponding features consistently throughout the figures, there are shown preferred embodiments.

FIG. 1 illustrates steps to be performed by a task while accessing kernel shared resources in a single core system, according to prior art.

Referring to the FIG. 1, consider a task A which is running on a single core SMP system. At step 102, the task A needs to access the shared resources of the kernel. At step 104, the kernel scheduler disables interrupts (ISRs) in order to allow the task A to access the shared resources of the kernel.

At step 106, the task A gets accesses to the shared resources of the kernel. Further, the task A processes and uses the shared resources of the kernel. At step 108, kernel scheduler enables the interrupts as the task A has finished accessing the shared resources of the kernel. Further, at step 110, the normal execution of the task A continues. The access to the shared resources of the kernel is obtained by the only task running on the single core of the SMP system as and when the task requires. However, in case of the multi-core system, there are plurality of cores on which a plurality of tasks may be running at any given instance of time.

Figure 2:
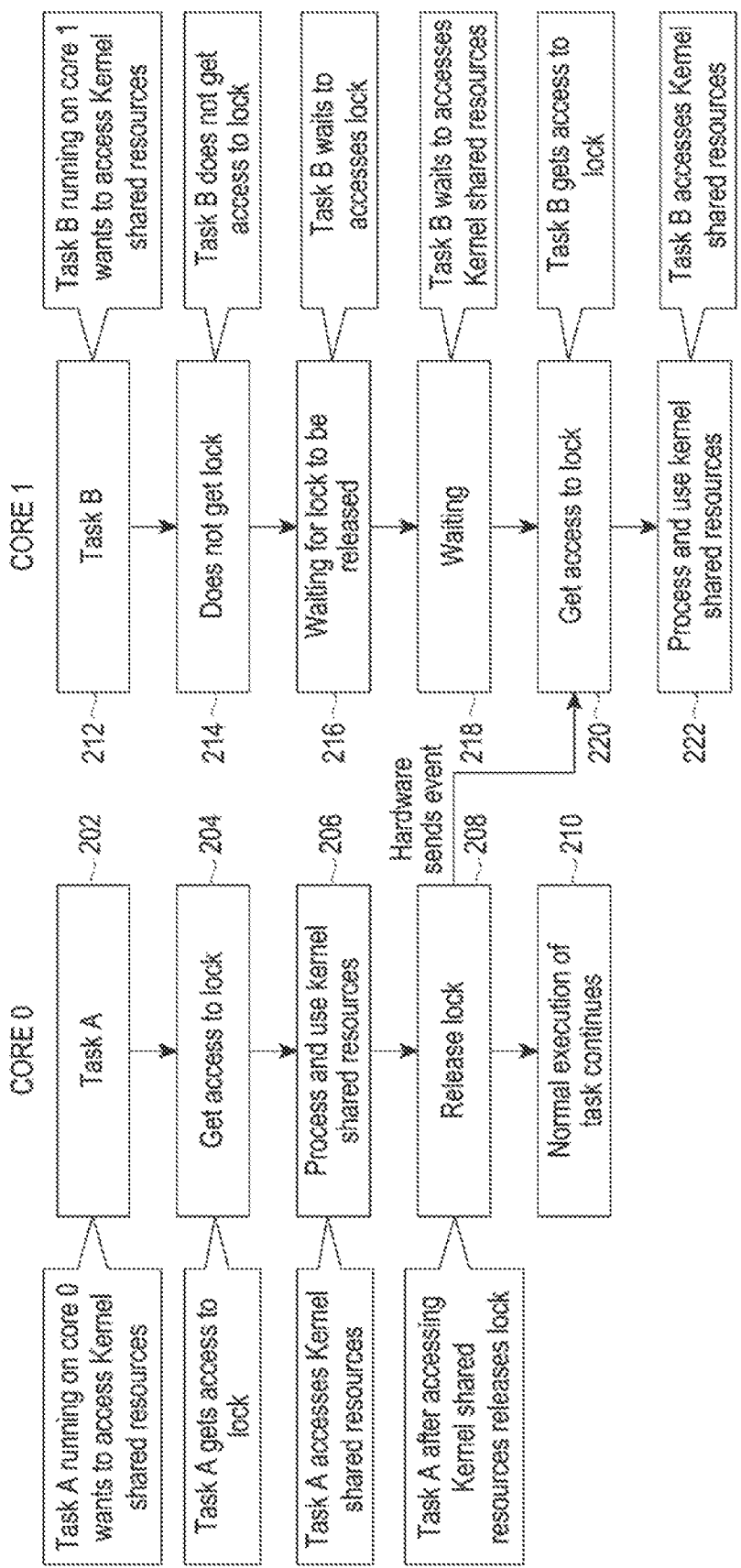
FIG. 2 illustrates steps to be performed by a plurality of tasks while accessing the kernel shared resources in a multi-core system, according to prior art.

FIG. 2 illustrates steps to be performed by a plurality of tasks while accessing the kernel shared resources in a multi-core system, according to prior art.

Referring to the FIG. 2, consider core 0 and core 1 as the two cores on which task A (at step 202) and task B (at step 212) are being executed simultaneously, in the multi-core system. Further, at step 202 and step 212, the kernel scheduler determines that both the task A and the task B needs to access the critical section of the respective core, to get access to the shared resources of the kernel.

In the conventional multi-core systems when a task wants to gain exclusive access to the shared resources of the kernel, the task needs to acquire a common kernel lock. The common kernel lock restricts the parallel execution of kernel object instances such as for example mutex, semaphore, events, message queues etc, associated with the core kernel services, across the plurality of cores of the multi-core system that are independent of each other when executing on different cores.

Therefore, at step 204, the task A gets the common kernel lock and hence at step 206, the task A accesses the shared resources of the kernel. However, at step 214, the task B is not able to acquire the common kernel lock, which will enable the task B to access the shared resources of the kernel and hence, at steps 216-218, the task B is waiting to get access to the common kernel lock. The kernel object that the task A is accessing and the kernel object that the task B intends to access may be different. However, due to the use of the common kernel lock, the execution of the task B on core 1 is stalled until the task A running on the core 0 releases the common kernel lock.

At step 208, the task A releases the common kernel lock and the kernel scheduler sends an event to the task B running on the core 1 indicating that the common kernel lock can be acquired. Therefore, at step 220, the task B acquires the common kernel lock, and at step 222, the task B accesses the shared resources of the kernel.

The common kernel locks utilized by the kernels are core based and hence, do not have any impact on the single core systems. However the common kernel lock has a huge impact in the multi-core systems when one core acquired the common kernel lock, the execution on the other core gets stalled.

Figure 3A:
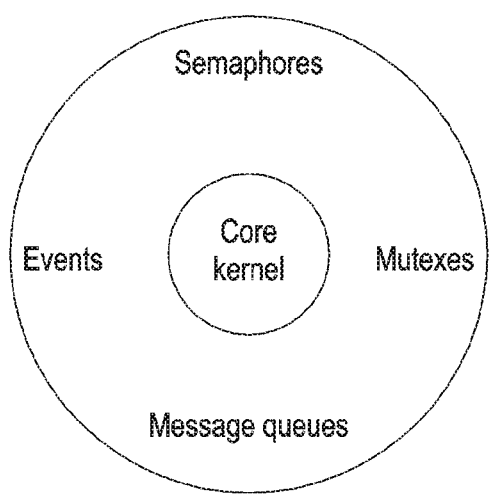
FIG. 3A illustrates a monolithic kernel protection using a single kernel lock when the task wants to access the kernel shared resources in the multi-core system, according to prior art.

FIG. 3A illustrates a monolithic kernel protection using a common kernel lock when the task wants to access the kernel shared resources in the multi-core system, according to prior art.

In multi-core system providing SMP support, the kernel services acquires the common kernel lock to gain exclusive access to the shared resources of the kernel which restrict the parallel execution of the kernel object instances that are independent of each other when executing on different cores.

Referring to the FIG. 3A, consider the circle represents the common kernel lock for the kernel and the shared resources of the kernel such as the mutexes, the semaphores, the events and the message queues associated with the core kernel services. Consider a task A running on the core 0 and wants to access a semaphore associated with the core kernel services. Therefore, the task A has acquired the common kernel lock and is using the semaphore. Consider a task B running on the core 1 and wants to access a mutex associated with the core kernel services. But the task B will not be able to access the mutex associated with the core kernel services, as the common kernel lock is already acquired by the task. Therefore, until the task A releases the common kernel lock, the task B cannot access the mutex, even though the task A is accessing the kernel object instances which are the semaphore and not the mutex.

Figure 3B:
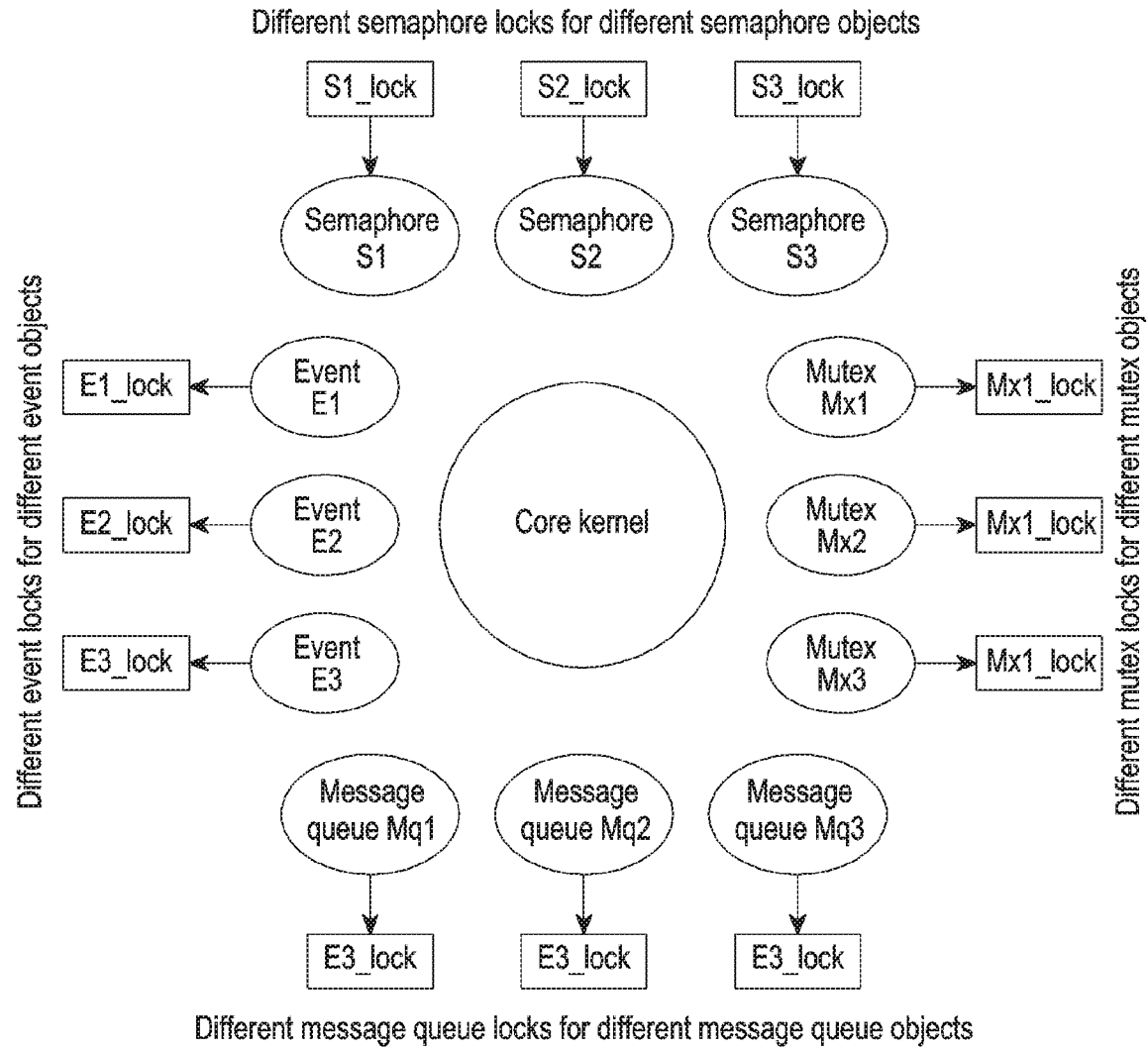
FIG. 3B illustrates specific locks for a specific kernel shared resource when the task wants to access the specific kernel shared resources in the multi-core system, according to an embodiment as disclosed herein.

FIG. 3B illustrates specific object locks for the specific shared kernel object resource when the task wants to access the specific kernel shared resources in the multi-core system, according to an embodiment as disclosed herein. Referring to the FIG. 3B, the proposed method addressed the limitations of the common kernel lock, as described in FIG. 3A by providing exclusive object specific locks for shared resources of the kernel. The object specific lock are represented by the circles around each of the kernel objects.

Referring to the FIG. 3B, the proposed method provides the object-specific lock for each of the shared resources of the kernel. Consider that the task A requires accessing a semaphore S1 and the task B requires accessing a semaphore S2 and Task C requires the mutex M1. The proposed method provides a specific lock for the semaphore S1 i.e., S1_lock, a specific lock for the semaphore S2 i.e., S2_lock and a specific lock for mutex M1 i.e. M1_lock. Therefore, the tasks which have to access the shared resource of the kernel running on the same core or the different core are not stalled, as each of the shared resources of the kernel has a specific lock.

Figure 4A:
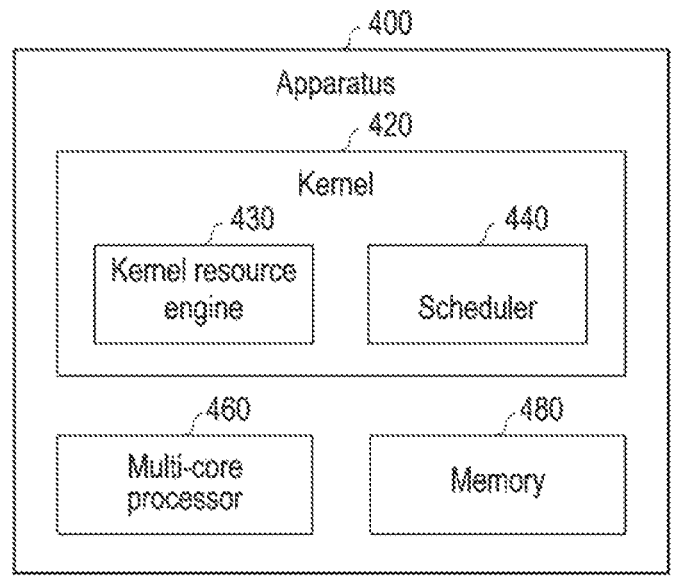
FIG. 4A is a block diagram of an apparatus for managing kernel services in the multi-core system, according to an embodiment as disclosed herein.

FIG. 4A is a block diagram of the apparatus 400 for managing the kernel services in the multi-core system, according to an embodiment as disclosed herein.

Consider the apparatus 400 which includes an operating system which supports SMP processing on the multi-core system. The operating system includes a kernel 420 which allows inter-task communication, signaling and scheduling services. The kernel 420 is capable of scheduling the tasks (context switching of tasks) on the plurality of cores of the multi-core system based on scheduling schemes such as priority based preemptive scheduling, time slice based scheduling logic, etc. The tasks in the multi-core system transit between various states such as a READY state, a SUSPENDED state and a RUNNING state. The kernel 420 includes a kernel resource engine 430. The apparatus 400 also includes a scheduler 440, a multi-core processor 460 and a memory 480.

In an embodiment, the apparatus 400 can be, for example, a mobile phone, a smart phone, Personal Digital Assistants (PDAs), a tablet, a wearable device, an Internet of things (IoT) device, etc.

In an embodiment, the kernel 420 is system software that manages the apparatus elements and software resources. The locking principles described herein are for RTOS but can be applicable to any system. The kernel resource engine 430 is configured to design the lock for the kernel 420. The kernel resource engine 430 also configures the object-specific locks for the shared resources of the kernel. The shared resources of the kernel include the mutex, the semaphore, the event, the message queue, etc. The object-specific locks includes configuring the specific lock for the specific shared resource of the kernel i.e., the mutex-specific lock, the semaphore-specific lock, the event-specific lock, and the message queue-specific lock. Further, the kernel resource engine 430 is also configured to parallel process the IPC services for the different shared resources on the plurality of cores of the multi-core processor 460 using the object-specific locks.

In an embodiment, the scheduler 440 is configured to schedule tasks (context switching of tasks) based on scheduling schemes such as for example, a priority based preemptive scheduling, a time slice based scheduling and the like. Due to scheduling of the tasks by the scheduler 440, the tasks transit between multiple states such as READY, SUSPENDED and RUNNING, etc.

In an embodiment, the multi-core processor 460 is made up of plurality of cores with interconnections between individual cores. The plurality of cores may be referred to collectively, or in general, as cores. The multi-core processor 460 can be configured to read from and/or write to the memory 480. Such read and write operations may relate to both instructions and data associated with operations of the plurality of cores of the multi-core processor 460. Further, each of the cores within the multi-core processor 460 may be configured to individually access the memory 480. The signaling between the plurality of cores is achieved by generating software driven hardware interrupts to the plurality of cores participating in the SMP.

In an embodiment, the memory 480 is configured to store the instructions and the data associated with operations on the cores of the multi-core processor 460. The memory 480 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 480 may, in some examples, be considered a non-transitory storage medium. The term "non-transitory" may indicate that the storage medium is not embodied in a carrier wave or a propagated signal. However, the term "non-transitory" should not be interpreted that the memory 480 is non-movable. In some examples, the memory 480 is configured to store larger amounts of information than the memory. In certain examples, a non-transitory storage medium may store data that can, over time, change (e.g., in Random Access Memory (RAM) or cache).

Although the FIG. 4A shows the hardware elements of the apparatus 400 but it is to be understood that other embodiments are not limited thereon. In other embodiments, the apparatus 400 may include less or more number of elements. Further, the labels or names of the elements are used only for illustrative purpose and does not limit the scope of the disclosure. One or more components can be combined together to perform same or substantially similar function of managing the kernel services in the multi-core system.

Figure 4B:
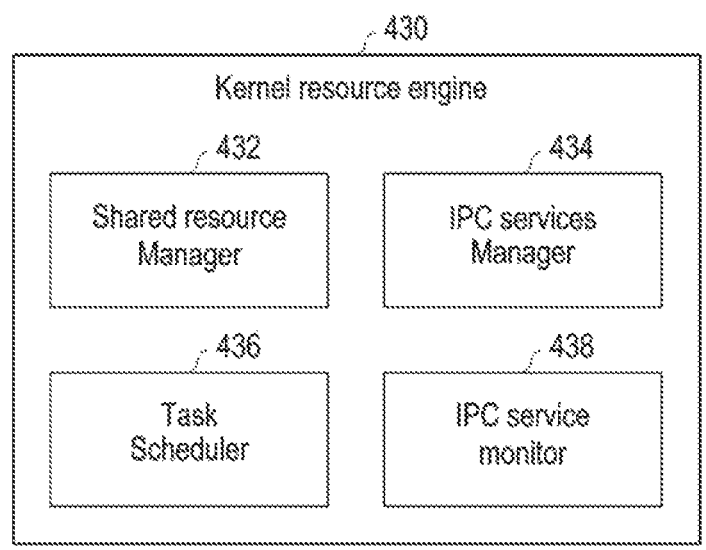
FIG. 4B is a block diagram of a kernel resource engine of the apparatus for managing kernel services in the multi-core system, according to an embodiment as disclosed herein.

FIG. 4B is a block diagram of the kernel resource engine 430 of the apparatus 400 for managing the kernel services in the multi-core system, according to an embodiment as disclosed herein.

Referring to the FIG. 4B, the kernel resource engine 430 includes a shared resource manager 432, an IPC services manager 434, a task scheduler 436 and an IPC service monitor 438.

In an embodiment, the shared resource manager 432 is configured to classify the shared resources of the kernel such as for example, consider message queue (MQ) instances like MQ1, MQ2 . . . MQn of the shared resource of the kernel a message queue (MQ).

Further, the shared resource manager 432 is configured to design the lock for the kernel and the object-specific locks for each of the shared resources of the kernel. Further, the shared resource manager 432 is also configured to design specific object-specific locks for the specific shared resource of the kernel. Further, shared resource manager 432 is configured to associate the instances of the shared resources with a unique object-specific lock to exclusively access the separate shared resource across the multi task environment executing on the multi-core system. For example, consider the share resource of the kernel is the semaphores. The shared resource manager 432 configures a semaphore-specific lock for the semaphores as a whole and also specific locks for the individual semaphores such as the semaphore S1 has a object-specific lock S1_lock, the semaphore S2 has a object-specific lock S2_lock, and the like.

Further, the shared resource manager 432 is configured to receive a request from at least one task to get access to the at least one shared resource of the kernel and determine the at least one shared resource of the kernel for which the at least one task needs to get the access. Further, the shared resource manager 432 is also configured to acquire the object-specific lock on the at least one shared resource of the kernel based on the request from at least one task. Therefore, the object-specific locks allow the concurrent access of the shared resources of the kernel across the multiple cores of the multi-core system without the tasks having to wait for the separate IPC object instances.

In an embodiment, the IPC services manager 434 is configured to retrieve the IPC data structure corresponding to the existing task which is accessing the at least one shared resource of the kernel within the object-specific lock. The IPC is the process which the OS provides to allow the processes to manage the shared data. The IPC services may operate and modify the shared resources of the kernel such as the message queues, the events, the semaphores and the mutex along with kernel data structures which maintain the task control blocks (TCB's), for example a task ready queue. The IPC objects are interdependent and coupled to kernel data structures operating on the TCB's.

Further, the IPC services manager 434 is configured to retrieve the IPC data of the existing task from the structure and determine whether a scheduling action needs to be performed on a task control block (TCB) based on the IPC data. The IPC services manager 434 includes an IPC service monitor integrated within the kernel IPC service implementation which detects the need for invoking the task scheduler 436 in a current context of the IPC kernel service. When the task requesting to access the shared resources of the kernel 420 belongs to the same core as the running task, then the task scheduler 436 is not invoked and only the shared resources instances is processed by gaining access to the object specific lock.

Further, the IPC services manager 434 is configured to determine that the existing task on the at least one shared resource of the kernel needs to be suspended in response to determining that the scheduling action needs to be performed on the TCB. Or, the IPC services manager 434 determines that the task on the at least one shared resource of the kernel need not be suspended in response to determining that the scheduling action need not be performed on the TCB. Therefore, based on the determination of whether the scheduling action need to be performed on the TCB or not, the IPC services manager 434 determines whether the existing task accessing the at least one shared resource of the kernel needs to be suspended.

In an embodiment, the task scheduler 436 is configured to execute the tasks which have the highest priority at any given point of time on the plurality of cores of the multi-core system. The tasks are assigned priorities and based on the preemptive scheduling scheme the tasks in the ready state are executed. The IPC services can change the states of tasks in the multi-core system and cause a transition from the running state to suspended state or from the running state to suspended/ready states.

Further, the task scheduler 436 is configured to suspend the existing task accessing the at least one shared resource of the kernel based on the input from the IPC services manager 434. Or the task scheduler 436 is configured to allow the existing task accessing the at least one shared resource of the kernel 420 to continue accessing the shared resource of the kernel 420 based on the input from the IPC services manager 434. Further, the task scheduler 436 is configured to determine whether the existing task accessing the at least one shared resource needs to be suspended or not.

The task scheduler 436, in response to determining that the existing task on the at least one shared resource need not be suspended, is configured to release the object-specific lock for the at least one shared resource of the kernel 420 and schedule a task associated with the task request to access the at least one shared resource.

The task scheduler 436, in response to determining that the existing task on the at least one shared resource needs to be suspended, is configured to retrieve the existing task information from a message queue and release the object-specific lock for the at least one shared resource of the kernel. Further, the task scheduler 436 is configured to block a task associated with the task request and acquire the lock for the kernel Further, the task scheduler 436 is configured to move the blocked task to ready state for scheduling and release the lock for the kernel, and schedules the task associated with the task request to access the at least one shared resource.

In an embodiment, the IPC service monitor 438 is configured to determine the need for invocation of the scheduler 440.

Figure 5:
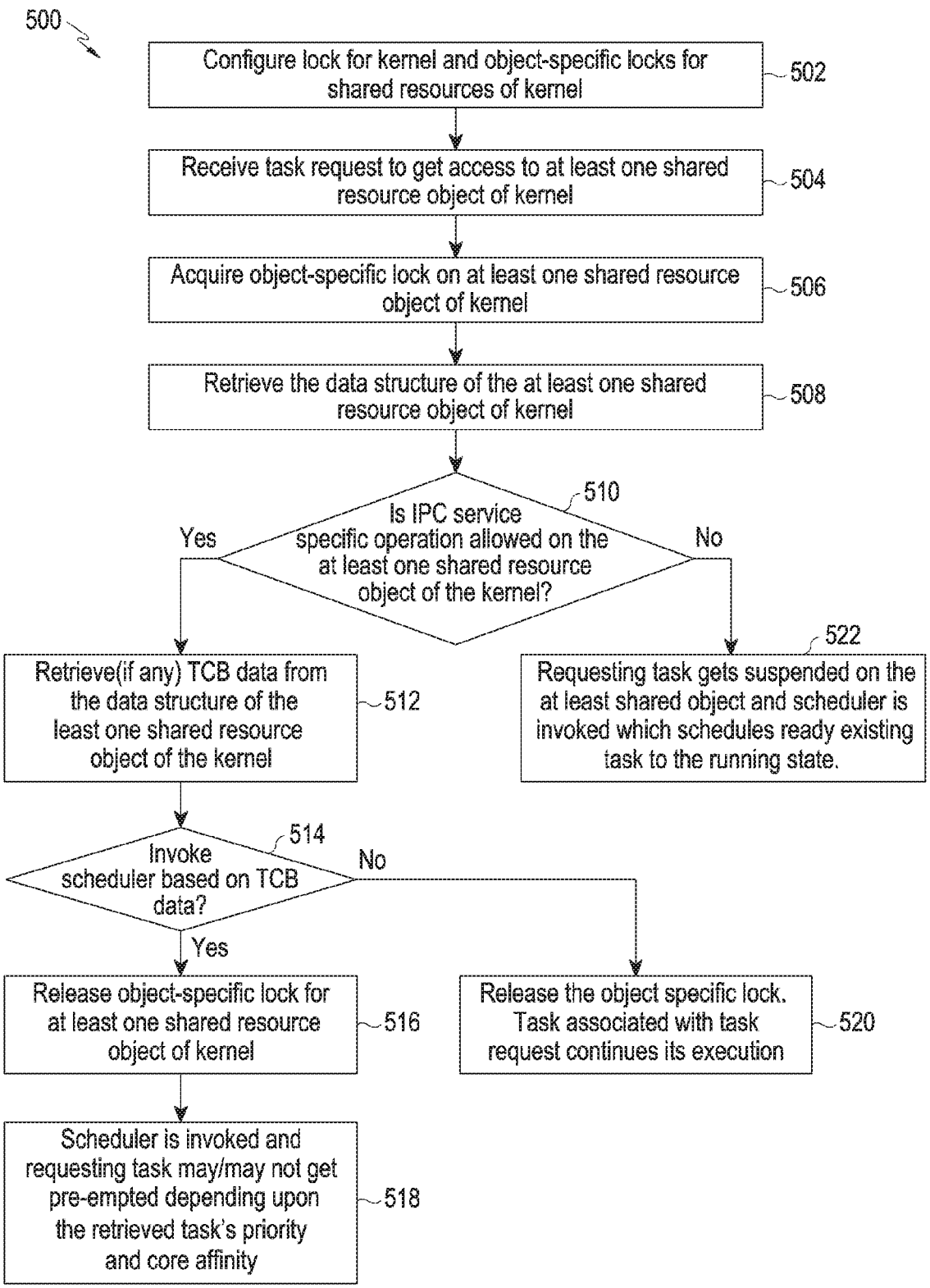
FIG. 5 is a flow chart illustrating a method managing the kernel services in the multi-core system, according to an embodiment as disclosed herein.

FIG. 5 is a flow chart illustrating a method managing the kernel services in the multi-core system, according to an embodiment as disclosed herein.

Referring to the FIG. 5, at step 502, the apparatus 400 configures the lock for the kernel 420 and the object-specific locks for the shared resources of the kernel 420. For example, in the apparatus 400 as illustrated in the FIG. 4A, the kernel resource engine 430 is configured to configure the lock for the kernel 420 and the object-specific locks for the shared resources of the kernel 420.

At step 504, the apparatus 400 receives the task request to get access to the at least one shared resource of the kernel 420. For example, in the apparatus 400 as illustrated in the FIG. 4A, the kernel resource engine 430 is configured to receive the task request to get access to the at least one shared resource of the kernel 420.

At step 506, the apparatus 400 acquires the object-specific lock on the at least one shared resource of the kernel 420. For example, in the apparatus 400 as illustrated in the FIG. 4A, the kernel resource engine 430 is configured to acquire the object-specific lock on the at least one shared resource of the kernel.

At step 508, the apparatus 400 retrieves the IPC data structures corresponding to the existing task on the at least one shared resource of the kernel 420 inside the object-specific lock. For example, in the apparatus 400 as illustrated in the FIG. 4A, the kernel resource engine 430 is configured to retrieve the IPC data structures corresponding to the existing task on the at least one shared resource of the kernel inside the object-specific lock.

At step 510, the apparatus 400 determines whether an IPC service specific operation is allowed on the at least one shared resource. The requesting task is suspended if the operation is not allowed upon which the task scheduler 436 is invoked to schedule an existing task to a running state.

In an embodiment, the apparatus 400 determines whether scheduling action is to be performed on the thread control block (TCB) based on the IPC data. For example, in the apparatus 400 as illustrated in the FIG. 4A, the kernel resource engine 430 is configured to determine whether scheduling action is to be performed on the thread control block (TCB) based on the IPC data.

In response to determining that the requested IPC service operation is allowed on at least one of the shared resource object, at step 512, the apparatus 400 determines that the task on the at least one shared resource of the kernel need not be in suspended state. For example, in the apparatus 400 as illustrated in the FIG. 4A, the kernel resource engine 430 is configured to determine that the task on the at least one shared resource of the kernel need not be in suspended state. Further, at step 512, TCB data is retrieved from the data structure of the least one shared resource object of the kernel.

At step 522, in response to determining that the requested IPC service operation is not allowed on at least one of the shared resource object, the apparatus 400 determines that scheduling action is to be performed and the task associated with the task request needs to be suspended. For example, in the apparatus 400 as illustrated in the FIG. 4A, the kernel 420 is configured to determine that task associated with the task request on the at least one shared resource of the kernel needs to be suspended, in response to determining that the requested IPC service operation is not allowed on at least one of the shared resource object. If the IPC service specific operation is not allowed, the task associated with the task request gets suspended and the task scheduler 436 is invoked to schedule a ready existing task to a running state.

At step 514, based on the retrieved TCB data, the apparatus 400 determines if the task scheduler 436 is not to be invoked. If not invoked, at step 520, the apparatus 400 releases the object-specific lock for the at least one shared resource of the kernel and the task associated with the task request is further continued to be executed. For example, in the apparatus 400 as illustrated in the FIG. 4A, the kernel resource engine 430 is configured to release the object-specific lock for the at least one shared resource of the kernel.

If the task scheduler 436 is invoked, at steps 516 and 518, the object-specific lock is released, scheduler is invoked and the task associated with the task request is preempted based on the priority and core affinity of the retrieved TCB data from the data structure of the least one shared resource object of the kernel.

In an embodiment, the apparatus 400 schedules the task associated with the task request to access the at least one shared resource. For example, in the apparatus 400 as illustrated in the FIG. 4A, the kernel resource engine 430 is configured to schedule the task associated with the task request to access the at least one shared resource.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 6:
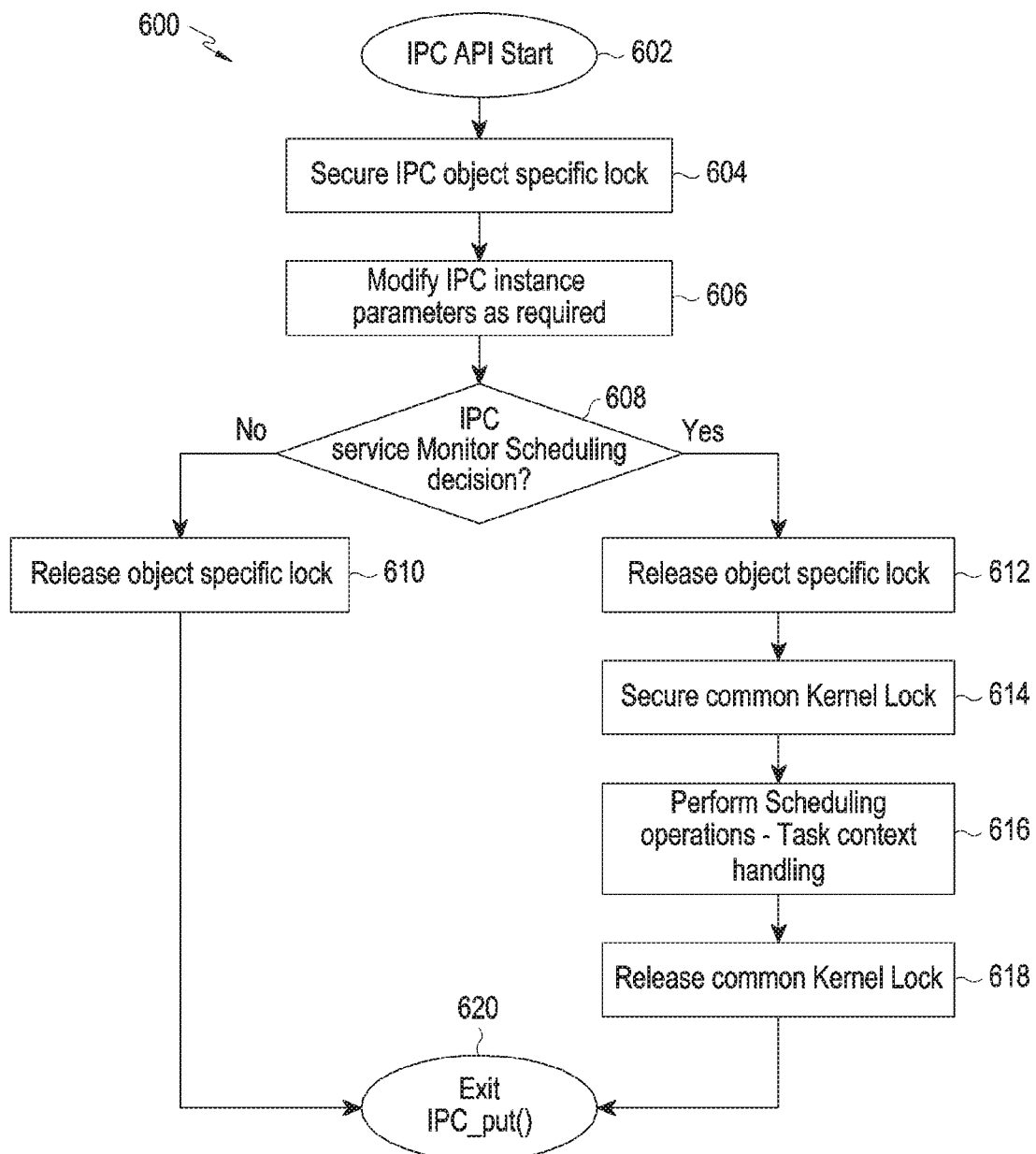
FIG. 6 is a flow chart illustrating a sequence of steps for inter-process communication application programming interface (IPC API) based on the object-specific locks for the shared resources of the kernel, according to an embodiment as disclosed herein.

FIG. 6 is a flow chart 600 illustrating a sequence of steps for the inter-process communication application programming interface (IPC API) based on the object-specific locks for the shared resources of the kernel, according to an embodiment as disclosed herein.

Referring to the FIG. 6, the functionally separate process which implements a logic working on one of the shared kernel resources is provided.

At step 602, the IPC API starts executing within a single context of the IPC kernel service process.

At step 604, the IPC API acquires the object specific lock associated with the IPC object for the processing of the IPC object. At step 606, the IPC API modifies the IPC instance parameters associated with the IPC object based on the requirements, as the IPC API has exclusive access to the IPC object.

At step 608, the IPC service monitor 438 determines whether the scheduler 440 needs to be invoked.

On determining that the scheduler 440 need not be invoked, at step 610, the IPC API releases the object specific lock associated with the IPC object and the exits from the logic working on one of the shared kernel resources.

On determining that the scheduler 440 has to be invoked, at step 612, the IPC API releases the object specific lock associated with the IPC object on completion of the processing of the IPC object instance. Further, at step 614, the IPC API secures the common kernel lock to access the kernel data structure. At step 616, the IPC API performs the scheduling operations such as task context handling and releases the common kernel lock on completion of the scheduling operations, at step 618. Further, the IPC API exits from the logic working on one of the shared kernel resources.

Figure 7:
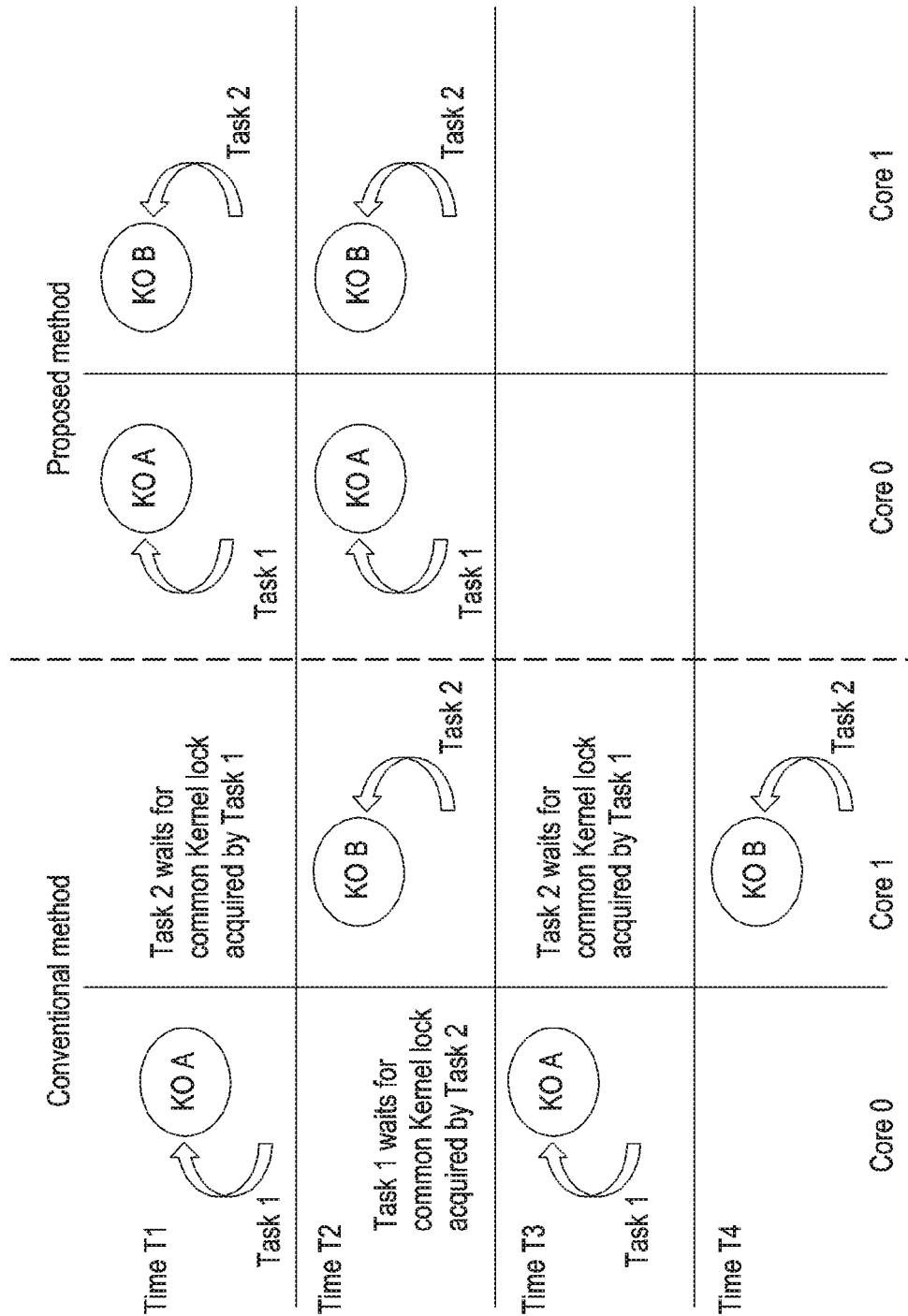
FIG. 7 is an example illustrating a comparison of a conventional monolithic kernel locking for accessing the shared resources of the kernel and the object-specific locking for accessing the shared resources of the kernel, according to an embodiment as disclosed herein.

FIG. 7 is an example illustrating a comparison of a conventional monolithic kernel locking for accessing the shared resources of the kernel and the object-specific locking for accessing the shared resources of the kernel, according to an embodiment as disclosed herein.

Consider a kernel object A (e.g., Semaphore A) is used to restrict the maximum usage of Resource X to two. Consider another kernel object B (e.g., Semaphore B) which is used to restrict the maximum usage of Resource Y to two. A task 1 which is executing on the core 0 needs to acquire Resource X two times and a task 2 which is executing on the core 1 needs to acquire Resource Y two times. The task 1, the task 2, the semaphore A and the semaphore B are all independent of each other.

In the conventional method, during a time interval T1, the task 1 has acquired the common kernel lock for accessing the Semaphore A and the task 2 needs to wait for common kernel lock to be released by the task 1, so that the task 2 can acquire the common kernel lock to acquire the Semaphore B. At time interval T2, the task 2 has acquired the common kernel lock for accessing the Semaphore B and the task 1 needs to wait for common kernel lock to be released by the task 2, so that the task 1 can acquire the common kernel lock to acquire the Semaphore A. Similarly, during the time interval T3 and T4, the task 2 and task 1 are in waiting to acquire the common kernel lock to access the Semaphore B and Semaphore A, which are independent of each other.

Unlike the conventional methods, in the proposed method at the time interval T1, the task1 acquires the Semaphore A's lock and the task 2 acquires the Semaphore B's lock. Further, both the task 1 and the task 2 can execute in parallel due to no interdependency. Similarly, at a time interval T2, the task1 acquires the Semaphore A's lock and the task 2 acquires the Semaphore B's lock and both execute in parallel. Therefore, the proposed method provides 100% parallelization across the cores of the multi-core processing system.

The proposed method provides disconnected IPC object instances and scheduler processing. The critical sections are segregated respectively using the object specific locks and common kernel lock which provides integrity of the kernel operation along with high parallel execution for independent IPC object instances.

Figures 8A, 8B:
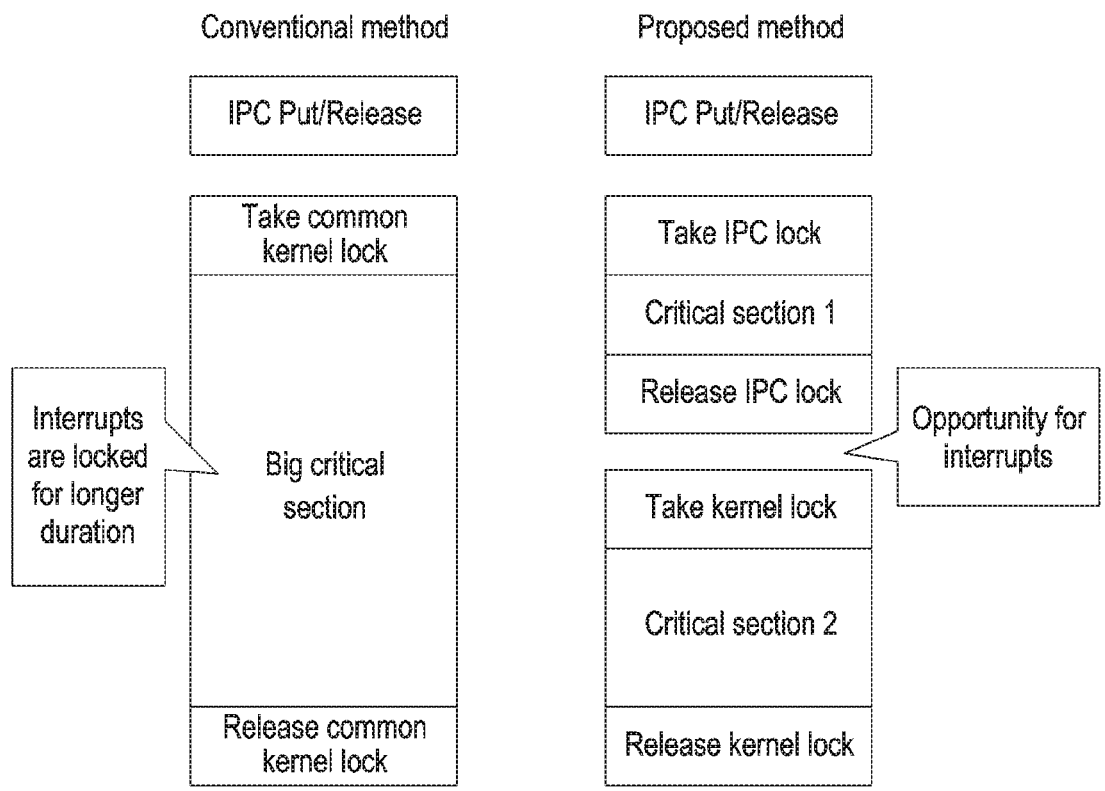
FIGS. 8A-8B is an example illustrating a comparison of an interrupt locking in conventional methods and the interrupt locking when the object-specific locks are used for accessing the shared resources of the kernel, according to an embodiment as disclosed herein.

FIGS. 8A and 8B are an example illustrating a comparison of an interrupt locking in conventional methods and the interrupt locking in when the object-specific locks are used for accessing the shared resources of the kernel, according to an embodiment as disclosed herein.

In the conventional method, when the tasks acquire the common kernel lock to access the critical section of the code, then the interrupts within the task are locked for a longer duration of time till the task releases the common kernel lock, as shown in FIG. 8A.

Unlike the conventional methods, the proposed method provides the object specific locks and the specific locks for specific shared resources. Therefore, the kernel service split functionally and the object specific locks have reduced the interrupt locking periods without affecting the determinism of the apparatus 400. Referring to the FIG. 8B, the proposed method enables unlocking the interrupts in the larger critical section of the kernel without affecting the determinism due to which size of the critical section of the kernel is fragmented. Thus the smaller the duration of interrupts lock provide better time responsiveness.

Further, the fragmented critical section of the kernel improves system behavior and allows the scheduler 440 to act on the latest changes in the system. Therefore, the proposed method also reduces the redundancy in the system.

Figure 9:
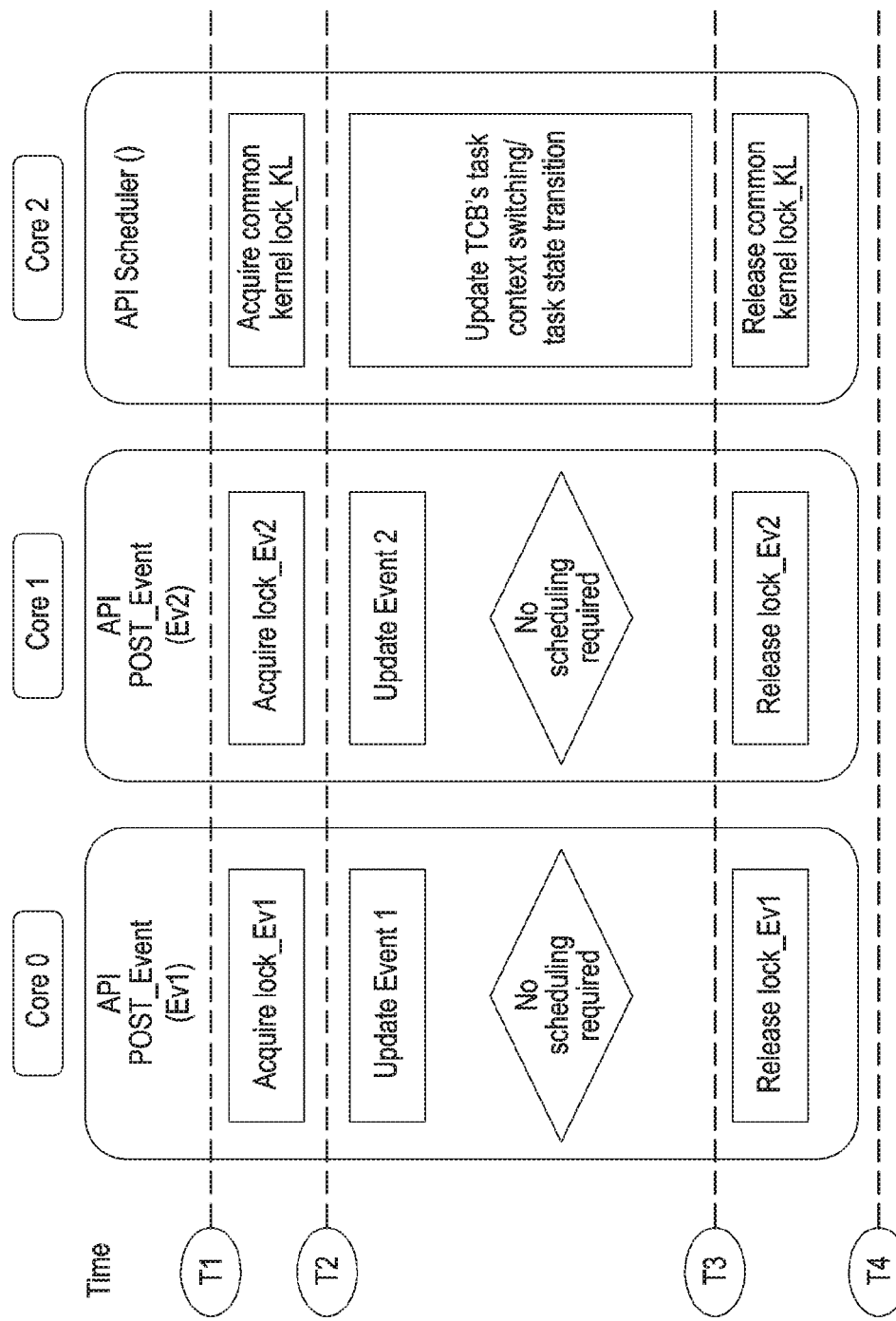
FIG. 9 is an example illustrating concurrent kernel services flow when the object-specific locks are used for accessing the shared resources of the kernel, according to an embodiment as disclosed herein.

FIG. 9 is an example illustrating concurrent kernel services flow when the object-specific locks are used for accessing the shared resources of the kernel, according to an embodiment as disclosed herein.

Referring to the FIG. 9, consider a multi-core processor having the plurality of cores i.e., core 0, core 1 and core 2. Consider a first IPC kernel service executing on the core 0 and a second IPC kernel service executing on the core 1. The first IPC kernel service needs to access a first IPC object instance i.e., first event (Ev1) and the second IPC kernel service needs to access a second IPC object instance i.e., second event (Ev2). In the proposed method, the inter-task communication kernel services operate and modify the IPC objects like message queues, events, semaphores and mutex, along with the kernel data structures maintaining the task control blocks (TCB's) like the task ready queue.

In FIG. 9, at time T1, the first IPC kernel service acquires the object-specific lock for the EV1 i.e., Acquire lock_Ev1. At time T2, the first IPC kernel service operates and modifies the EV1. Further, on determining that no scheduling is required, at time T3 the first IPC kernel service releases the object-specific lock for the EV1. Further, at time T4, the first IPC kernel service will continue to execute normally on the core 0. When the first IPC kernel service is executing on the core 0, the second IPC kernel service is simultaneously executing on the core 1, as the Ev1 and the Ev2 are independent of each other. Therefore, the method allows the parallel execution of the first IPC kernel service and the second IPC kernel service when dealing with independent IPC instances.

Further, during the processing of the IPC specific data, the kernel specific data can also be accessed by a third IPC kernel service simultaneously by acquiring the common kernel lock (which is executing on the core 2).

Figure 10:
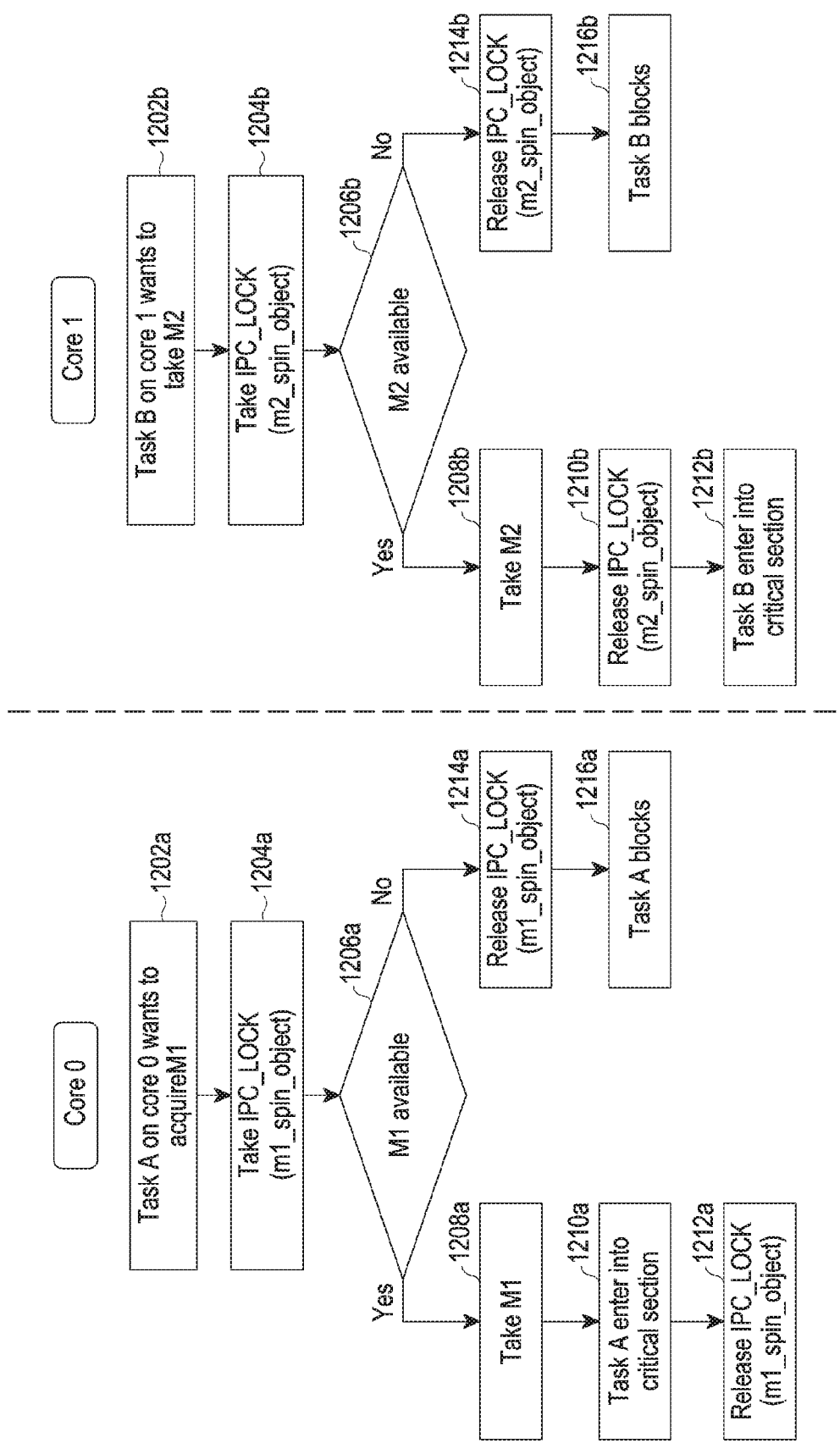
FIG. 10 is an example illustrating a parallel execution of the tasks on the two critical sections which are independent of each other using the object-specific locks for accessing the shared resources of the kernel, according to an embodiment as disclosed herein.

FIG. 10 is an example illustrating the parallel execution on the two critical sections which are independent of each other using the object-specific locks for accessing the shared resources of the kernel, according to an embodiment as disclosed herein.

Parallelization can be achieved with identical IPC service running on the plurality of cores of the multi-core system, when the IPC object instance under process are different. In conventional methods and systems at any given instance of time only one instance of IPC service is accessed and concurrent access gets into busy wait state.

Consider the task A which is executing on the core 0 and wants to acquire the mutex M1 (step 1202*a*). Similarly the task B is executing on the core 1 and wants to acquire the mutex M2 (step 1202*b*). In the conventional methods which use the common kernel lock, in case task A wants to access the shared resources of the kernel such as the mutex M1, then the task A acquires the common kernel lock and enters the critical section of code. When the task A has finishes executing in the critical section of code, the task A releases the common kernel lock. Further, the task B will be able to access the shared resources of the kernel only after the task A releases the common kernel lock after completing execution in the critical section of code.

Referring to the FIG. 10, unlike to the conventional methods, the proposed method provides the object specific lock to the shared resources of the kernel and also specific lock to each of the specific shared resources.

At step 1204*a*, the task A acquires the object specific lock for the specific mutex M1 i.e., IPC_LOCK (m1_spin_object).

At step 1206*a*, the task A determines whether the mutex M1 is available. Further, on determining that the mutex M1 is available, the task A takes the mutex M1 (step 1208*a*) and enters the critical section of the code and executes (step 1210*a*). Further, on completion of the execution in the critical section of the code, the task A releases the object specific lock for the specific mutex M1 (step 1212*a*). At step 1206*a*, if the task A determines that the mutex M1 is not available, then the task A releases the object specific lock for the specific mutex M1 (step 1214*a*) and the task A is suspended (step 1216*a*) till the task A acquires the mutex M1.

In a parallel manner, the task B which is executing on the core 1, at step 1204*b* acquires the object specific lock for the specific mutex M2 i.e., IPC_LOCK (m2_spin_object). And perform the similar steps 1106*b*-1116*b*, as performed by the task A since the kernel resources are fragmented and are specific to the kernel objects i.e., the mutex_1 and the mutex_2 both can be acquired simultaneously without waiting for each other Therefore, the proposed method of utilizing multiple kernel object specific locks allows the parallel execution of the two critical section which are independent of each other.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for managing kernel services in a multi-core system, comprising:
   configuring a common kernel lock for a kernel and object-specific locks for at least one shared resource of the kernel; and
   while processing kernel data of an inter process communications (IPC) service on a core among a plurality of cores of the multi-core system based on the common kernel lock,
   receiving a task request to get access to at least one shared resource object of the kernel, the task request being one of IPC services for different shared resources on cores among the plurality of cores based on the object-specific locks, acquiring, by a task associated with the task request, an object-specific lock of the object-specific locks on the at least one shared resource object of the kernel, determining the task associated with the task request on the at least one shared resource object of the kernel, and processing IPC data of the IPC services for different shared resources on the cores among the plurality of cores of the multi-core system based on the object-specific locks and a result of the determination.

2. The method of claim 1, wherein the at least one shared resource includes a mutex, a semaphore, an event, a message queue, and wherein the object-specific locks include a mutex-specific lock, a semaphore-specific lock, an event-specific lock, and a message queue-specific lock.

3. The method of claim 1, wherein in case that the task associated with the task request on the at least one shared resource object of the kernel is suspended, the method further comprises:

retrieving IPC data structure of the at least one shared resource object inside the object-specific lock;

determining that a requested IPC service specific operation is not allowed on the at least one shared resource object of the kernel;

suspending the task associated with the task request to be suspended on the at least one shared resource object of the kernel;

releasing the object-specific lock; and invoking a scheduler to schedule an existing task in a ready state to a running state.

4. The method of claim 1, wherein in case that the task associated with the task request on the at least one shared resource object of the kernel is preempted, the method further comprises:

retrieving IPC data structure of the at least one shared resource object inside the object-specific lock;

determining whether a requested IPC service specific operation is allowed on the at least one shared resource object of the kernel;

determining whether at least one existing task is in suspended state on the at least one shared resource object of the kernel;

retrieving a task control block (TCB) of the at least one existing suspending task from the at least one shared resource object of the kernel and changing a state of the TCB to a ready state;

determining whether the retrieved TCB causes the preemption of the task associated with the task request;

releasing the object-specific lock; and invoking a scheduler to take scheduling action and place the existing task in a ready state to preempt the task associated with the task request.

5. The method of claim 1, in case that the task associated with the task request on the at least one shared resource object of the kernel is continued, the method further comprises:

retrieving IPC data structure of the at least one shared resource object inside the object-specific lock;

determining whether a requested IPC service specific operation is allowed on the at least one shared resource object of the kernel;

determining whether at least one existing task is in suspended state on the at least one shared resource object of the kernel;

retrieving a task control block (TCB) of the at least one existing suspending task from the at least one shared resource object of the kernel and changing a state of the TCB to a ready state;

determining whether the retrieved TCB does not cause the preemption of the task associated with the task request;

releasing the object-specific lock; and invoking a scheduler to add an existing task to a ready queue.

6. The method of claim 1, wherein in case that the task associated with the task request on the at least one shared resource object of the kernel continues its execution, the method further comprises:

retrieving IPC data structure of the at least one shared resource object inside the object-specific lock;

determining whether a requested IPC service specific operation is allowed on the at least one shared resource object of kernel;

determining whether no task is in suspended state on the retrieved data structure; and releasing the object-specific lock.

7. The method of claim 1, further comprises:

detecting a scheduler invocation event;

unblocking access to data structure worked upon by a specific kernel service application programming interface (API) and blocking access to a second specific kernel service API for scheduling; and unblocking access to the second specific kernel service API after the scheduling is completed.

8. An apparatus for managing kernel services in a multi-core system, comprising:

a memory;

a multi-core processor comprising a plurality of cores; and a kernel to execute on the multi-core processor, wherein the kernel comprises a kernel resource engine and a kernel scheduler, wherein the kernel resource engine is coupled to the multi-core processor and the memory and configured to:

configure a common kernel lock for the kernel and object-specific locks for at least one shared resource of the kernel; and while processing kernel data of an inter process communications (IPC) service on a core among a plurality of cores of the multi-core system based on the common kernel lock, receive a task request to get access to at least one shared resource object of the kernel, the task request being one of IPC services for different shared resources on cores among the plurality of cores based on the object-specific locks, acquire an object-specific lock, by a task associated with the task request, on the at least one shared resource object of the kernel, determine the task associated with the task request on the at least one shared resource object of the kernel, and process IPC data of the IPC services for different shared resources on the cores among the plurality of cores of the multi-core system based on the object-specific locks and a result of the determination.

9. The apparatus of claim 8, wherein the at least one shared resource includes a mutex, a semaphore, an event, a message queue, and wherein the object-specific locks include a mutex-specific lock, a semaphore-specific lock, an event-specific lock, and a message queue-specific lock.

10. The apparatus of claim 8, wherein in case that the task associated with task request on at least one shared resource object of the kernel needs to be suspended, the kernel resource engine is further configured to:
- retrieve IPC data structure of at least one shared resource object inside the object-specific lock;
- determine whether a requested IPC service specific operation is not allowed on at least one shared resource object of the kernel;
- suspend the task associated with the task request to be suspended on at least one shared resource object of the kernel;
- release the object-specific lock; and
- invoke a scheduler to schedule an existing task in a ready state to a running state.

11. The apparatus of claim 8, wherein in case that the task associated with the task request on the at least one shared resource object of the kernel needs to be preempted, the kernel resource engine is further configured to:
- retrieve IPC data structure of at least one shared resource object inside the object-specific lock;
- determine whether a requested IPC service specific operation is allowed on the at least one shared resource object of the kernel;
- determine whether at least one existing task is in suspended state on the at least one shared resource object of the kernel;
- retrieve a TCB of the at least one existing suspending task from the at least one shared resource object of the kernel and changing a state of the TCB to a ready state;
- determine whether the retrieved TCB causes the preemption of the task associated with the task request;
- release the object-specific lock; and
- invoke a scheduler to take scheduling action and make an existing task in a ready state to preempt the task associated with the task request.

12. The apparatus of claim 8, wherein in case that the task associated with the task request on the at least one shared resource object of the kernel needs to continue its execution, the kernel resource engine is further configured to:
- retrieve IPC data structure of at least one shared resource object inside the object-specific lock;
- determine whether a requested IPC service specific operation is allowed on the at least one shared resource object of the kernel;
- determine whether the at least one existing task is in suspended state on the at least one shared resource object of the kernel;
- retrieve a TCB of the at least one existing suspending task from the at least one shared resource object of the kernel and change a state of the TCB to a ready state;
- determine that the retrieved TCB does not cause the preemption of the task associated with the task request;
- release the object-specific lock;
- invoke a scheduler to add an existing task to a ready queue.

13. The apparatus of claim 8, wherein in case that the task associated with the task request on the at least one shared resource object of the kernel needs to continue its execution, the kernel resource engine is further configured to:
- retrieve IPC data structure of at least one shared resource object inside the object-specific lock;
- determine whether a requested IPC service specific operation is allowed on the at least one shared resource object of the kernel;
- determine whether no task is in suspended state on the shared resource object of the kernel; and
- release the object-specific lock.

* * * * *